United States Patent [19]

Shermis

[11] Patent Number: 5,226,138
[45] Date of Patent: Jul. 6, 1993

[54] METHOD FOR SELECTIVELY TRANSFERRING DATA INSTRUCTIONS TO A CACHE MEMORY

[75] Inventor: J. Herschel Shermis, Göthenburg, Sweden

[73] Assignee: Sun Microsystems, Inc., Mountain View, Calif.

[21] Appl. No.: 618,698

[22] Filed: Nov. 27, 1990

[51] Int. Cl.⁵ .......................... G06F 9/38; G06F 9/32; G06F 13/00
[52] U.S. Cl. .................. 395/425; 364/964.24; 364/DIG. 1; 364/261.3; 395/375
[58] Field of Search ................ 395/375, 425; 364/DIG. 1 MS File, DIG. 2 MS File, 200 MS File, 900 MS File, 261.3, 231.8, 964.24, 964.26

[56] References Cited

U.S. PATENT DOCUMENTS

| | | | |
|---|---|---|---|
| 4,594,659 | 6/1986 | Guenther et al. | 364/200 |
| 4,594,660 | 6/1986 | Guenther et al. | 364/200 |
| 4,626,988 | 12/1986 | George | 364/200 |
| 4,679,141 | 7/1987 | Pomerene et al. | 395/375 |
| 4,742,451 | 5/1988 | Bruckert et al. | 395/375 |
| 4,750,112 | 6/1988 | Jones et al. | 364/200 |
| 4,894,772 | 1/1990 | Langendorf | 364/200 |
| 4,924,376 | 5/1990 | Ooi | 364/200 |
| 4,942,520 | 7/1990 | Langendorf | 395/425 |
| 5,163,140 | 11/1992 | Stiles et al. | 395/425 |

*Primary Examiner*—Alyssa H. Bowler
*Attorney, Agent, or Firm*—Blakely Sokoloff Taylor & Zafman

[57] ABSTRACT

A cache controller is coupled between a central processing unit (CPU) and a memory management unit (MMU). The MMU is coupled to main memory, and the cache controller is further coupled to a cache memory. A cache controller transfers a block of N programming instructions from the main memory into the cache memory. Once this transfer is complete, the CPU begins the sequential execution of the N instructions. Generally concurrently, the cache controller scans each of the N instructions to detect branch instructions. Branch instructions are those instructions which require additional data not found within the block of N instructions previously loaded into the cache. Upon detection a branch instruction, and prior to the execution of the branch instruction by the CPU, the cache controller fetches the branch instruction data from main memory, and stores it within the cache.

1 Claim, 2 Drawing Sheets

METHOD FOR SELECTIVELY TRANSFERRING DATA INSTRUCTIONS TO A CACHE MEMORY

BACKGROUND OF THE INVENTION

1. Field of the Invention

The present invention relates to memory systems for computers, and more particularly, to methods and apparatus for increasing the execution speed of computer programs.

2. Art Background

In many data processing systems, it is common to utilize a high speed buffer memory, referred to as a "cache" coupled to a central processing unit (CPU) to improve the average memory access time for the processor. The use of a cache is based upon the premise that over time, a data processing system will access certain localized areas of memory with high frequency. The cache typically contains a subset of the complete data set disposed in the main memory, and can be accessed very quickly by the CPU without the necessity of reading the data locations in the main memory.

In data processing systems which employ virtual addressing techniques, a memory management unit (MMU) is coupled between main memory and a cache controller. In the event the CPU attempts to access data which is not disposed in the cache, the cache controller applies a virtual address provided by the CPU to the MMU. The MMU translates the virtual address into a real address, and accesses a particular data location in main memory in which the data is stored. This data is then transferred into the cache and/or provided directly to the CPU. In the case of data comprising computer program instructions, blocks of instructions are typically transferred from main memory into the cache for direct access by the CPU. During the execution of these instructions, it is quite common for branch instructions to be encountered which requires additional branch data to be accessed by the CPU. If the branch data is not currently stored in the cache memory, the cache controller must initiate a memory access to main memory to fetch the branch data so that it may be executed by the CPU. The requirement that branch data be obtained from main memory and stored in the cache and/or provided directly to the CPU reduces the efficiency and speed of the data processing system.

As will be described, the present invention discloses apparatus and methods for reducing instances in which the CPU must halt program execution prior to fetching branch instruction data from main memory. In the present invention, the cache controller scans a block of instruction code for branch instruction, and loads branch instruction data into the cache prior to execution by the CPU.

SUMMARY OF THE INVENTION

An improved cache controller is disclosed, having particular application for use in data processing systems employing high speed buffer caches coupled to a central processing unit. A cache controller is coupled between a central processing unit (CPU) and a memory management unit (MMU). The MMU is coupled to main memory, and the cache controller is further coupled to a cache memory. A cache controller transfers a block of N programming instructions from the main memory into the cache memory. Once this transfer is complete, the CPU begins the sequential execution of the N instructions. Generally concurrently, the cache controller scans each of the N instructions to detect branch instructions. Branch instructions are those instructions which branch to, and require, additional data not found within the block of N instructions previously loaded into the cache. Upon detection of a branch instruction, and prior to the execution of the branch instruction by the CPU, the cache controller fetches the branch instruction data from main memory, and stores it within the cache. Accordingly, the cache controller "looks ahead" of the CPU in the order of execution of the instructions, such that branch instructions are detected and branch data loaded, prior to the CPU executing the branch instruction. Therefore, the efficiency and speed of the data processing system is increased since the CPU need not cease execution of program instructions while branch instruction data is loaded from main memory.

NOTATION AND NOMENCLATURE

Figure 1:
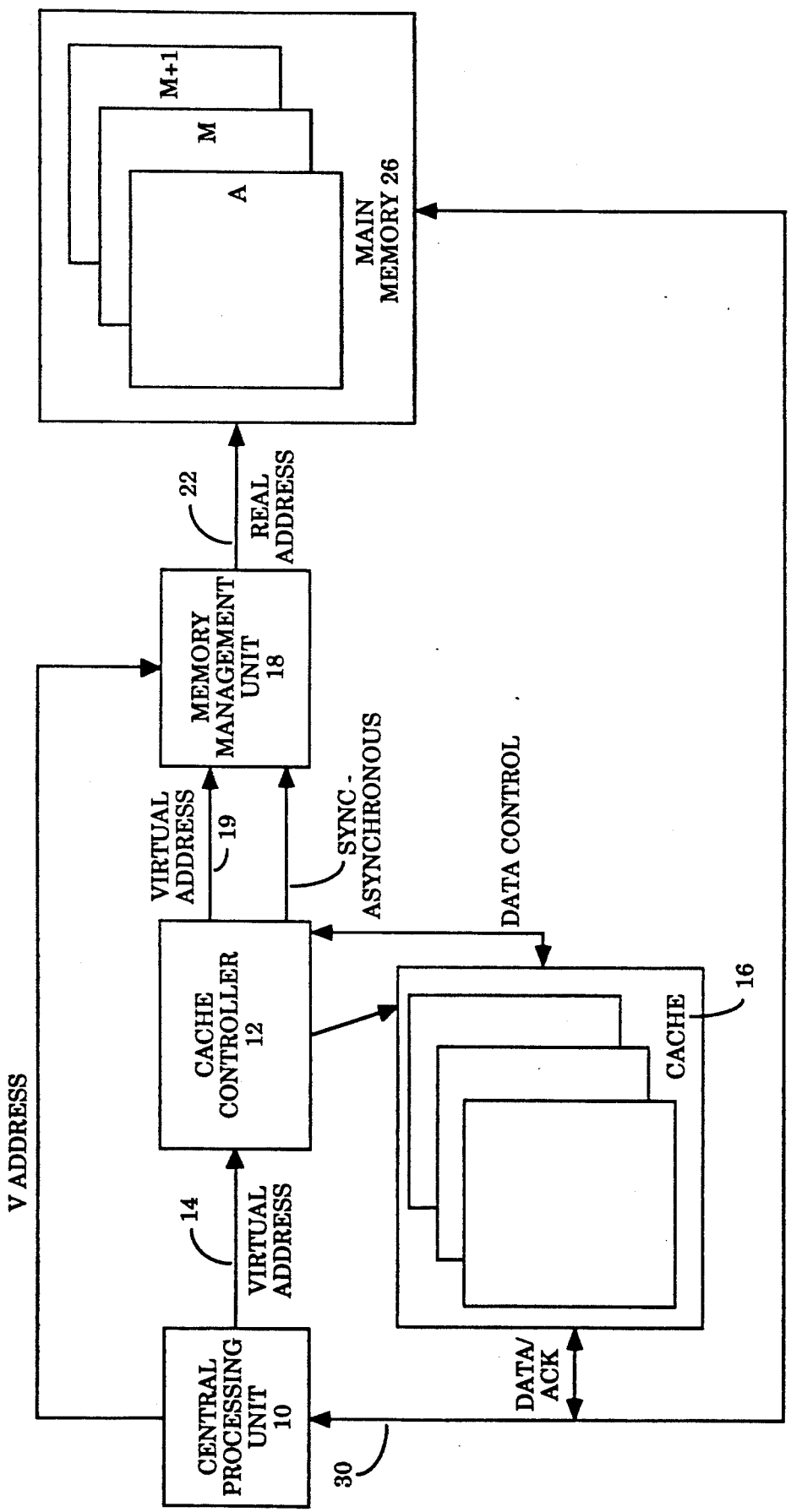
FIG. 1 is a block diagram conceptually illustrating one embodiment of the present invention.

The detailed description which follows is presented largely in terms of algorithms and symbolic representations of operations on data within a computer memory. These algorithmic descriptions and representations are the means used by those skilled in data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, memory cells, display elements, or the like. It should be kept in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases, the distinction between the method operations in operating a computer and the method of computation itself should be noted. The present invention relates to method steps for operating a computer and processing electrical or other (e.g. mechanical, chemical) physical signals to generate other desired physical signals.

The present invention also relates to apparatus for performing these operations. This apparatus may be specially constructed for the required purposes or it may comprise a general purpose computer as selectively activated or reconfigured by a computer program stored in the computer. The algorithms presented herein are not inherently related to any particular computer or other apparatus. In particular, various general purpose machines may be used with the teaching herein, or it may prove more convenient to construct more specialized apparatus to perform the required method steps. The required structure for a variety of these machines will be apparent from the description given below.

CODING DETAILS

No particular programming language has been indicated for carrying out the various procedures described herein. This is in part due to the fact that not all languages that might be mentioned are universally available. Each user of a particular computer will be aware of a language which is most suitable for his immediate purposes. In practice, it has proven useful to substantially implement the present invention in an assembly language which provides a machine executable object code. Because the computers and the monitor systems which may be used in practicing the instant invention consist of many diverse elements, no detailed program listing has been provided. It is considered that the operations and other procedures described herein and illustrated in the accompanying drawings are sufficiently disclosed to permit one of ordinary skill to practice the instant invention, or so much of it as is of use to him.

DETAILED DESCRIPTION OF THE INVENTION

An improved cache controller is disclosed, having particular application for use in data processing systems employing a cache memory. In the following description for purposes of explanation, specific memory devices, data structures, architectures and components are set forth in order to provide a thorough understanding of the present invention. However, it will be apparent to one skilled in the art that the present invention may be practiced without these specific details. In other instances, well known circuits are shown in block diagram form in order not to obscure the present invention unnecessarily.

With reference to FIG. 1, the present invention is disclosed conceptually in block diagram form. A central processing unit (CPU) 10 is coupled to a cache controller 12 by line 14. The cache controller 12 is further coupled to a cache memory 16 and to a memory management unit (MMU) 18, as shown. The MMU 18 is coupled over line 22 to main memory 26. Main memory 26 stores data within a plurality of pages (A through M+1), in which the data comprises programming instructions as well as numeric and other alphanumeric data. In the presently preferred embodiment, MMU 18 is a relatively high speed random access memory unit, such as a fast static RAM. The MMU 18 takes as an input a virtual address provided by the cache controller 12 over line 19, and provides as an output a translated physical (real) address over line 22 which corresponds to the actual physical row and column address of the desired data in a page of memory within the main memory 26.

Generally, in operation, the cache controller 12 fetches (reads) N programming instructions stored within the main memory 26. These N instructions are stored in cache 16 for execution by the CPU 10. The CPU 10 directly accesses the cache 16 over line 14 through the cache controller 12. Each programming instruction comprising the N block of instructions previously stored in the cache 16 is read, sequentially, by the CPU 10 and provided to the CPU over line 30. As the CPU nears completion of the execution of each block of N instructions, the cache controller 12 fetches an additional block of N instructions from main memory.

As is well known, in the event that CPU 10 attempts to access data that is not disposed within the cache 16, the cache controller 12 applies a virtual address corresponding to the needed data to MMU 18. After address translation by the MMU 18, a real address is provided on line 22 to the main memory 26. The data is read and is provided to the CPU 10 and, in certain architectures, the cache 16. (See, U.S. Pat. Nos. 4,550,368 and 4,527,232 for examples of MMU architectures and systems.)

Many computer programs include branch instructions which require that the CPU execute, or have access to, branch data located at other storage locations. When the CPU 10, during the course of execution of the N instructions disposed within the cache, comes upon a branch instruction, programming execution is halted until the required branch data is obtained. In the prior art, upon reaching a branch instruction, the CPU would halt the execution of any additional programming commands until the cache controller obtained the branch instruction data from main memory, and stored it in the cache. The CPU would then continue the execution of the program instructions.

In the presently preferred embodiment, CPU 10 comprises a reduced instruction set processor (RISC) in which the branch instructions stored in main memory provide the address for the required branch instruction data as part of the instruction itself.

Figure 2:
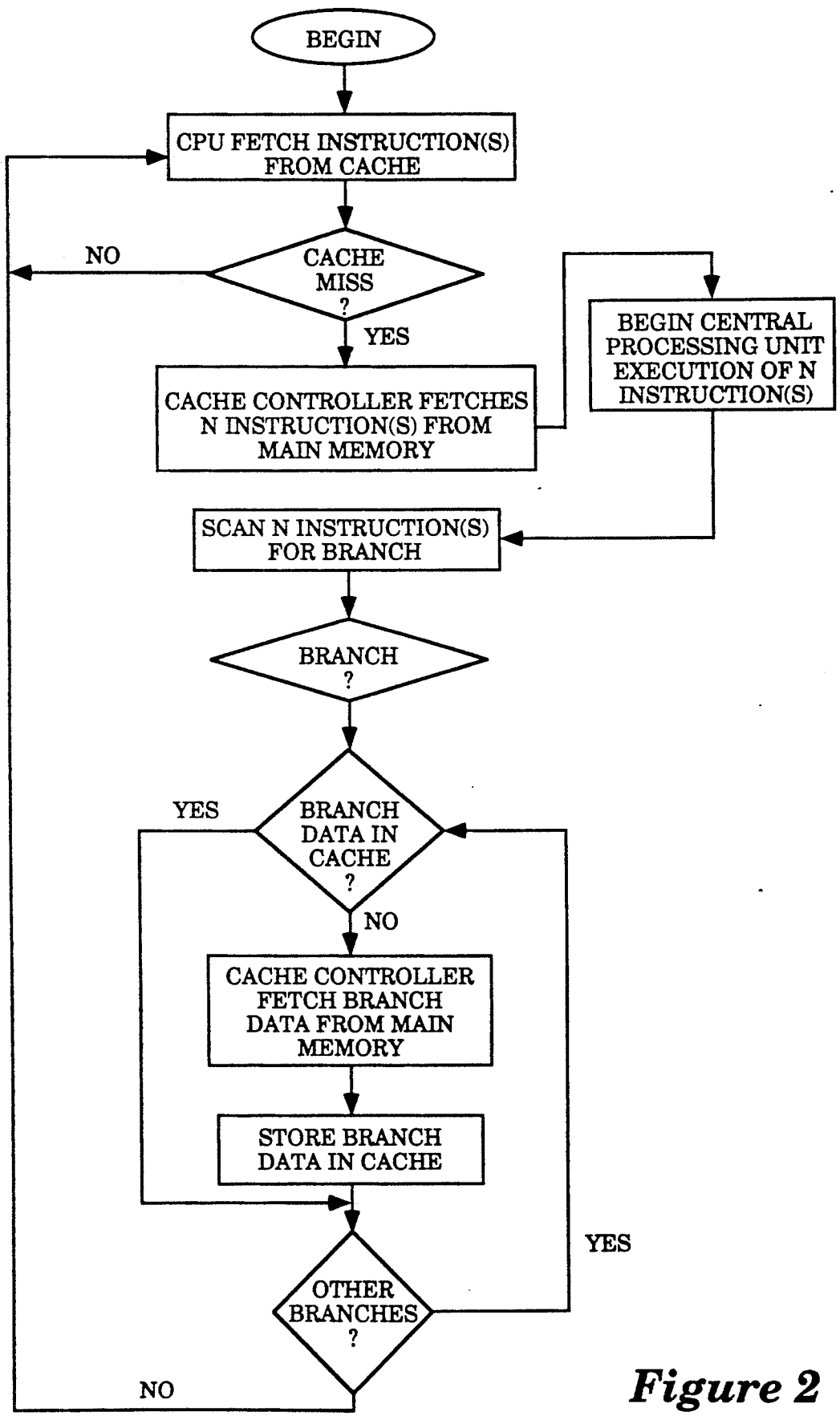
FIG. 2 is a flowchart identifying the sequence of operations of the embodiment illustrated in FIG. 1.

With reference now to FIGS. 1 and 2, the cache controller 12 reads N instructions from main memory 26 and transfers the N instructions to the cache 16. The cache controller "looks ahead" of the current instruction being executed by the CPU 10 to detect upcoming branch instructions. Upon detecting a branch instruction, the cache controller determines if the branch instruction data is currently stored in cache 16. If the branch instruction data is already stored within the cache 16, the cache controller continues its search for branch instructions by sequentially scanning the programming instructions stored in the cache. If, however, the branch instruction data is not currently stored in cache 16, the cache controller 12 provides the virtual address corresponding to the branch instruction data to MMU 18. The MMU translates the virtual address to a real address and applies it to main memory 26. The branch instruction data is then transferred to the cache 16 over line 30. In the presently preferred embodiment, not only is the specific branch instruction retrieved from main memory 26, but additional blocks surrounding the specific branch instruction data is also retrieved. It has been found that the retrieval of a block of data stored in locations surrounding the branch instruction increases the likelihood that data corresponding to subsequent branch instructions will then already be stored in the cache 16.

As is known, translation data for virtual addresses provided by the cache controller and/or CPU is stored within the MMU 18. If cache controller 12 detects a branch instruction which cannot be translated by MMU 18, because the MMU does not have the necessary translation data, then a page fault is issued by the MMU 18 and no further translation attempts are made at this time. In the protocol of the present invention, since cache controller 12 is "looking ahead" at instructions prior to the execution of the instructions by the CPU 10, the request for the branch instructions characterizes an "asynchronous prefetch". In the presently preferred embodiment, no further attempts are made to translate the virtual address corresponding to the branch instruction, since although it is possible that CPU 10 may require this data, once the branch instruction is reached, there exists the possibility that the CPU 10 will not need this data.

In the event the CPU 10, upon executing branch instruction, does indeed require the branch instruction data, the execution of CPU 10 is halted, and appropriate translation data is loaded into the MMU 18 to translate the virtual address corresponding to the particular branch instruction. Although under these conditions the execution of the programming instructions by CPU 10 is halted, it has been found that this is a very rare case, and, in fact, that such a condition does not adversely affect the operation of the data processing system.

Accordingly, an improved cache controller has been disclosed. Although the present invention has been described with reference to FIGS. 1 and 2, it will be appreciated that the figures are for illustration only, and that the present invention may be used in numerous other data processing systems.

I claim:

1. In a data processing system including a central processing unit (CPU) coupled to a cache controller, said cache controller coupled to a memory management unit (MMU) and a cache memory, said MMU further coupled to a main memory, an improved method for selectively transferring instruction data stored in said main memory to said cache memory, comprising the steps of:

said cache controller transferring N instructions from said main memory to said cache memory by applying virtual addresses corresponding to said N instructions to said MMU, said MMU translating said virtual addresses into real addresses and applying said real addresses to said main memory for retrieval of said N instructions;

said cache controller detecting any of said N instructions comprising branch instructions, said branch instructions requiring additional data to be transferred to said cache memory, each of said branch instructions include an address for accessing said additional data in said main memory;

said CPU executing said N instructions in parallel with said cache controller detecting said branch instructions such that said cache controller detects a particular branch instruction prior to execution of said particular branch instruction by said CPU;

said cache controller determining if said additional data is currently stored in said cache memory, such that if said additional data is not stored in said cache memory, said cache controller transferring said additional data corresponding to said branch instructions to said cache memory from said main memory prior to said CPU executing said branch instruction, said cache controller transferring said additional data by applying said addresses for accessing said main memory to said MMU, said MMU translating said virtual addresses into real addresses and applying said real addresses to said main memory, such that if said MMU is unable to translate the virtual addresses of said additional data, said additional data is not obtained from said main memory until said CPU executes said corresponding branch instruction in said N instructions.

* * * * *